(No Model.)

A. KRIBS.
MANUFACTURE OF GLASS JARS.

No. 564,825. Patented July 28, 1896.

WITNESSES:
Edward Thorpe
Theo. G. Hoster

INVENTOR
A. Kribs
BY
Munn & Co
ATTORNEYS

UNITED STATES PATENT OFFICE.

ANTHONY KRIBS, OF BROOKLYN, NEW YORK, ASSIGNOR OF ONE-HALF TO FRANK H. PALMER, OF SAME PLACE.

MANUFACTURE OF GLASS JARS.

SPECIFICATION forming part of Letters Patent No. 564,825, dated July 28, 1896.

Application filed December 13, 1895. Serial No. 572,049. (No specimens.)

*To all whom it may concern:*

Be it known that I, ANTHONY KRIBS, of Brooklyn, in the county of Kings and State of New York, have invented certain new and useful Improvements in the Manufacture of Glass Jars, of which the following is a full, clear, and exact description.

The object of the invention is to provide certain new and useful improvements in the manufacture of jars and other glassware, whereby the mouth and neck of the article is molded and the body is blown in a mold in a very simple and effective manner.

The invention consists principally in a method whereby the mouth and neck of the article are molded in the form of a cup, and then a lump of molten glass is placed in the cup to melt the bottom and sides thereof, and then finally the filled cup is inserted in the body-mold and blown to form the body of the article from the mouth and neck.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
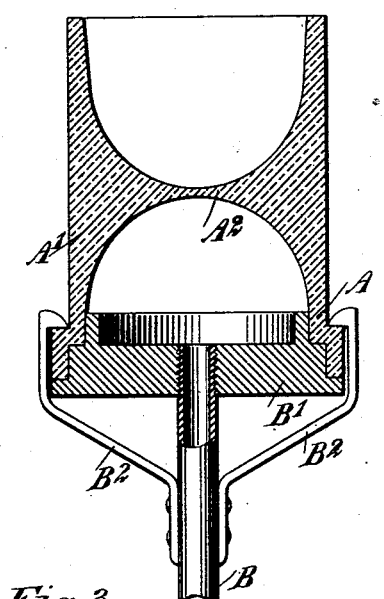
Figure 2:
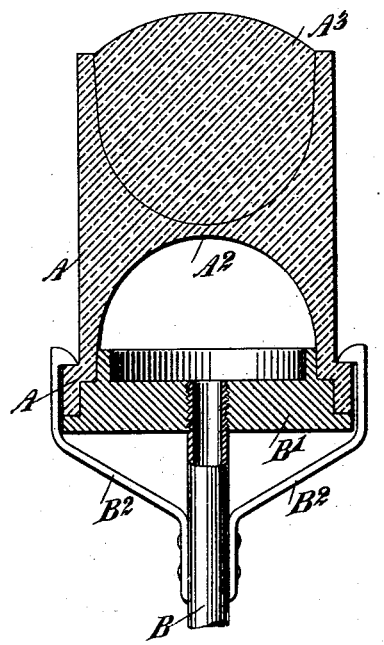
Figure 3:
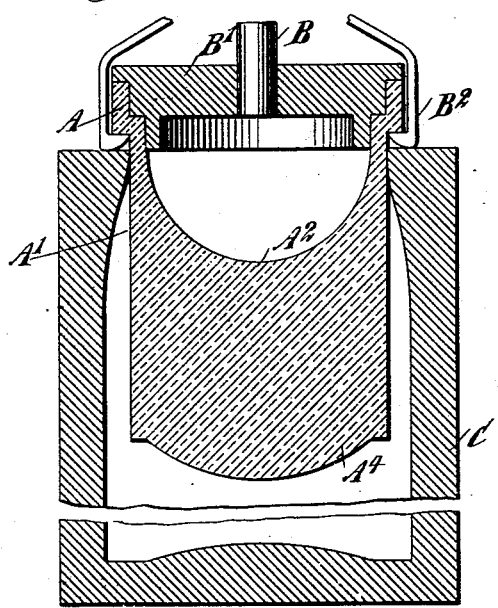
Figure 4:
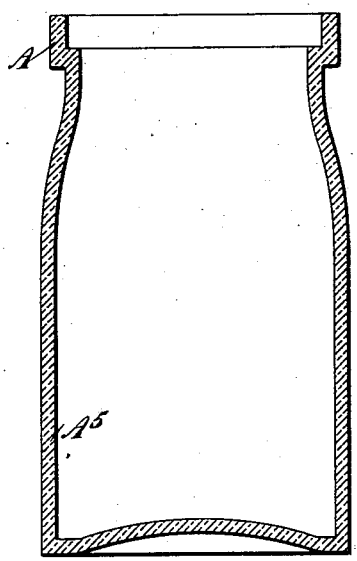

Figure 1 is a sectional side elevation of the molded cup. Fig. 2 is a similar view of the same with the molten glass therein. Fig. 3 is a sectional side elevation of the cup inserted in the body-mold, and Fig. 4 is a sectional side elevation of the finished article.

In order to form a jar or like article, I first mold in a suitable form the neck and mouth A of the jar, the neck being provided with an extension in the form of a cup $A'$, having its bottom $A^2$ preferably concaved, as plainly shown in Fig. 1. This combination cup and neck for the article is pressed in the usual manner in a form or mold, and after it is removed from the latter the cup is set on the base $B'$ of the blowpipe B, and held tight by a clamping device $B^2$, forming a part of the blowpipe B, and then the cup is filled with a lump $A^3$ of molten glass, as is plainly indicated in Fig. 2, the molten glass being sufficiently hot to melt the sides of the cup as well as the bottom, so that a solid lump $A^4$ is formed on the molded neck and mouth A. (See Fig. 3.) The operator now inserts this solid lump $A^4$ into the body-mold C, so that the neck and mouth A extend to the outside of the mold, and then the operator blows the solid lump $A^4$ into the mold C and produces the body $A^5$ of the article, as indicated in Fig. 4. It is understood that on closing the cup $A'$ by the base $B'$ of the blowpipe an air-chamber is formed for the air blown in through the pipe B.

It is to be understood that the operator in handling the cup $A'$ holds the same in an uppermost position, as shown in Figs. 1 and 2, to fill the cup with the lump $A^3$, and after the sides and bottom are melted into a solid lump $A^4$ then the article is placed upside down in the mold C, as shown in Fig. 3, to permit of conveniently blowing the body $A^5$.

By varying the mold for the neck A and the mold C for the body $A^5$, I am enabled to produce any desired configuration or shape of the neck as well as the body of the article to be made. By making the bottom $A^2$ of the cup $A'$ concaved I am enabled to more easily form the body $A^5$ with the blowpipe E, on account of the air-chamber, which helps to insure a uniform expansion of the lump $A^4$ by the air-pressure on the entire wall or bottom $A^2$, to produce the body $A^5$ of a uniform thickness.

I am aware that it is not new to form glassware by first pressing the mouth or neck to finished form with a depending mass of glass, and then withdrawing the plunger from the mold and removing the article therefrom, and finally inserting the article in a separate mold to blow the body into the molded part.

Having thus fully described my invention, I claim as new and desire to secure by Letters Patent—

1. The herein-described method for the manufacture of jars and other glassware, consisting in molding the mouth and neck of the article with a cup, then placing a lump of molten glass in the said cup to melt the bottom and sides thereof, then inserting the article thus formed in a separate mold, and finally blowing the molten glass to form the body of the article, substantially as shown and described.

2. The herein-described method for the manufacture of jars and other glassware, consisting in molding the neck and mouth of the article with an extension-cup having a concave bottom, then placing a lump of molten glass into the cup to melt the bottom and sides thereof and to form a solid lump, then inserting this lump of molten glass into a separate mold, and finally blowing it, to form the body of the article, substantially as shown and described.

ANTHONY KRIBS.

Witnesses:
THEO. G. HOSTER,
JNO. M. RITTER.